(12) United States Patent
Kaiser et al.

(10) Patent No.: US 8,820,288 B2
(45) Date of Patent: Sep. 2, 2014

(54) STEEL PISTON FOR INTERNAL COMBUSTION ENGINES

(75) Inventors: Timotheus Kaiser, Stuttgart (DE); Hermann Pfeifer, Essingen (DE); Wolfgang Rehm, Ulm (DE); Karl Weisskopf, Rudersburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/818,173

(22) PCT Filed: Aug. 30, 2011

(86) PCT No.: PCT/EP2011/004362
§ 371 (c)(1),
(2), (4) Date: Feb. 21, 2013

(87) PCT Pub. No.: WO2012/034647
PCT Pub. Date: Mar. 22, 2012

(65) Prior Publication Data
US 2013/0180493 A1    Jul. 18, 2013

(30) Foreign Application Priority Data
Sep. 13, 2010   (DE) .......................... 10 2010 045 221

(51) Int. Cl.
*C22C 38/04* (2006.01)
*C22C 38/06* (2006.01)

(52) U.S. Cl.
USPC ..................................................... 123/193.6

(58) Field of Classification Search
USPC ............... 123/193.6; 29/888.04; 92/208, 222

IPC .............. F02C 2201/021,2201/028, 2201/0406, F02C 2201/0409, 2201/0433, 2201/0448, F02C 2201/046, 2201/0463, 2201/0466; F02F 3/0084, 3/0092

See application file for complete search history.

(56) References Cited

U.S. PATENT DOCUMENTS

| | | | |
|---|---|---|---|
| 6,691,666 | B1 | 2/2004 | Berr et al. |
| 8,528,513 | B2 * | 9/2013 | Haug et al. ................. 123/193.6 |
| 2006/0166029 | A1 | 7/2006 | Inaguma et al. |
| 2006/0191508 | A1 | 8/2006 | Otsuka et al. |
| 2009/0178640 | A1 | 7/2009 | Haug et al. |
| 2009/0194059 | A1 * | 8/2009 | Grahle et al. ............... 123/193.6 |
| 2010/0037765 | A1 | 2/2010 | Gniesmer et al. |
| 2010/0253006 | A1 * | 10/2010 | Ishikawa et al. .............. 277/443 |
| 2011/0176914 | A1 | 7/2011 | Schall et al. |
| 2012/0174899 | A1 | 7/2012 | Haug et al. |

FOREIGN PATENT DOCUMENTS

| | | |
|---|---|---|
| DE | 4411059 A1 | 10/1995 |
| DE | 19953311 A1 | 6/2000 |

(Continued)

*Primary Examiner* — M. McMahon
(74) *Attorney, Agent, or Firm* — Patent Central LLC; Stephen A. Pendorf

(57) ABSTRACT

A semifinished product blank, suitable for the production of a steel piston (1) for internal combustion engines having cylinder crankcases made of light metal alloys. Such a steel piston (1) has at least one upper piston part (4) which has a combustion recess (2) and an annular wall (3), and a lower piston part (4') which has a piston skirt (5) and a connecting rod bearing (6). The semifinished product blank is made of an austenitic steel, that is stabilized with Ni, Mn and N and that has a thermal expansion coefficient in a range of 16 to $21 \times 10^{-6}$ K$^{-1}$. Also disclosed is a steel piston, which at least has a piston skirt (5) made of an austenitic steel that is stabilzed with Ni, Mn, N. The piston skirt (5) has a thermal expansion coefficient in a range of 16 to $21 \times 10^{-6}$ K$^{-1}$.

6 Claims, 2 Drawing Sheets

(56) References Cited

FOREIGN PATENT DOCUMENTS

| DE | 10244513 | A1 | 4/2004 |
| DE | 102005034306 | A1 | 5/2006 |
| DE | 102006030699 | A1 | 1/2008 |
| DE | 102009048124 | A1 | 4/2011 |
| EP | 1580288 | A1 | 9/2005 |
| EP | 1612395 | A1 | 1/2006 |
| WO | 2006048153 | A1 | 5/2006 |
| WO | 2010036533 | A2 | 4/2010 |

* cited by examiner

STEEL PISTON FOR INTERNAL COMBUSTION ENGINES

The invention relates to a semifinished product blank, which is suitable for the production of a steel piston for internal combustion engines having cylinder crankcases made of light metal alloys. The invention further relates to a steel piston for such internal combustion engines.

A factor of lightweight construction is the frequent use today of light metal alloys, in particular aluminium alloys, for internal combustion engine components such as cylinder crankcases. As a result of the tendency to obtain maximum performance from the smallest possible engines, increasingly higher requirements with regard to as high peak pressures as possible are imposed on piston engines, which can amount up to 250 bar, so that pistons made of light metal alloys or aluminium are no longer suitable. For this reason steel pistons are therefore again increasingly gaining in importance, especially for diesel engines. However the material combination of light alloy crank case and steel piston creates the problem of varying thermal expansion coefficients. The piston shaft, also known as the piston skirt, provides for the guide of the piston in the cylinder, wherefore sufficient clearance must be available to the cylinder. As a result of close guide given sufficient skirt length, piston tilt when the contact of the piston changes between opposite cylinder walls can be minimized and therefore also a main cause of slap noises developing in the engine sound.

DE 199 53 311 A1 describes a piston ring, which should effectively emulate any thermal expansion of a cylinder made of aluminium alloy. For this purpose the piston ring is made of austenitic steel that has a thermal expansion coefficient of more than $15 \times 10^{-6}$ per ° C. The austenitic steel used for constructing the piston ring contains nickel in a quantity of between 3.5 and 17 wt.-% and chrome in a quantity of between 15 and 20 wt.-%.

A method for the production of a piston of an internal combustion engine, in order to form a reinforcement in the combustion recess of the piston, is disclosed in DE 10 2005 034 306. Here the piston is assembled in particular by friction welding from two blanks, one of which is made of a high temperature-resistant steel, for example austenitic chromium-nickel steel, in order to form the reinforcement of the combustion recess. For this purpose a piston blank formed from the two blanks undergoes a shaping process in the area of the joint between the two blanks by which a combustion recess is formed.

DE 10 2006 030 699 A1 discloses a cast steel piston for internal combustion engines made of an upper piston part with combustion recess and annular wall as well as lower piston part with connecting rod bearing, which is cast as one piece and in a materially unitary manner by a low pressure casting method from a reduced-density steel alloy or a high-grade steel alloy. To this end use is made of mechanically highly loadable, light-weight steels which are economic to shape. A high-grade steel alloy used for this purpose has the following composition: 3 to 9 wt.-% manganese, 0.3 to 1 wt.-% silicon, 0.01 to 0.03 wt.-% carbon, 15 to 27 wt.-% chrome, 1 to 3 wt.-% nickel, 0.2 to 1 wt.-% copper, 0.05 to 0.17 wt.-% nitrogen and rest iron as well as unavoidable steel companion elements contained therein. This piston should withstand the increasingly high peak pressures.

On the basis of this prior art it is desirable to create components which are suitable for the production of optimized steel pistons, which meet the requirements with regard to high peak pressures.

This object is achieved by semifinished products with the features of claim 1.

A further object is to create steel pistons themselves, which have improved material properties with regard to high peak pressures and also with regard to the thermal expansion of a surrounding cylinder crankcase made of light alloy material such as aluminium.

The steel piston with the features of claim 4 achieves this object.

Further embodiments are described in the dependent claims.

An inventive semifinished product blank is suitable for the production of a steel piston for internal combustion engines having cylinder crankcases made of light metal alloys, which have high expansion coefficients. Such a steel piston usually has an upper piston part and a lower piston part, the upper part being provided with a combustion recess and an annular wall and—the lower part with a piston skirt and a connecting rod bearing. The semifinished product blank can form the upper piston part and/or the lower piston part and in order to come close to the expansion coefficient of the light alloy, for instance aluminium, is made according to the invention of an austenitic steel stabilized with Ni, Mn and N, that has a thermal expansion coefficient in a range of 16 to $21 \times 10^{-6}$ K$^{-1}$.

Such a semifinished product blank, if it is produced for instance as upper piston part, with a further semifinished product blank of the inventive type, which is formed as lower piston part, can be assembled into a multi-piece steel piston with upper piston part and lower piston part.

Joining can be carried out by means of friction welding, laser welding or induction welding.

An inventive steel piston for internal combustion engines having cylinder crankcases made of light metal alloys likewise pursues the idea of matching the cylinder components to the expansion coefficients of the light alloy. In this case at least the piston skirt of the steel piston, which comprises at least an upper piston part with a combustion recess and an annular wall, as well as a lower piston part with the piston skirt and a connecting rod bearing, is made of an austenitic steel stabilized with Ni, Mn and N. Its composition is selected so that it results in a steel with a thermal expansion coefficient in a range of 16 to $21 \times 10^{-6}$ K$^{-1}$.

Advantageously the austenitic steel is an Fe—Cr—Ni-austenite with a composition which contains 0.2 to 0.4 wt.-% C, 8 to 18 wt.-% Ni, 15 to 26 wt.-% Cr, 0.5 to 2 wt.-% Si, up to 12 wt.-% Mn, up to 2 wt.-% W, up to 2 wt.-% Nb, up to 2 wt.-% Al, 0.05 to 0.3 wt.-% N and Fe in a percentage, which corresponds to a difference portion to make up 100 wt.-% of the steel alloy.

The steel piston can be produced as one piece from the austenitic steel, for instance by forging a semifinished product blank such as that according to the invention, or it can be cast by means of a gravity- or low pressure casting method.

It can however also be constructed from several pieces, advantageously at least the upper piston part being made of a highly wear-resistant alloyed heat treatable steel, in particular a steel from the group comprising MoCr4, 42CrMo4, CrMo4, 31CrMoV6 or 25MoCr4 steels.

For production in several pieces the steel piston can be assembled from two semifinished product blanks. One of the semifinished product blanks in this case is formed as the upper piston part and the second semifinished product blank as piston skirt of the lower piston part or as lower piston part as such.

These and further advantages are described by the following description with reference to the accompanying figures.

The reference to the figures in the description serves to support the description and easier understanding of the subject matter. Elements or sections of elements, which are substantially identical or similar, may be provided with the same reference symbols. The figures are only a schematic illustration of one embodiment of the invention, wherein:

FIGS. 1 and 2 illustrate examples of steel piston 1, as they are made of inventive austenitic steel.

Figure 2:
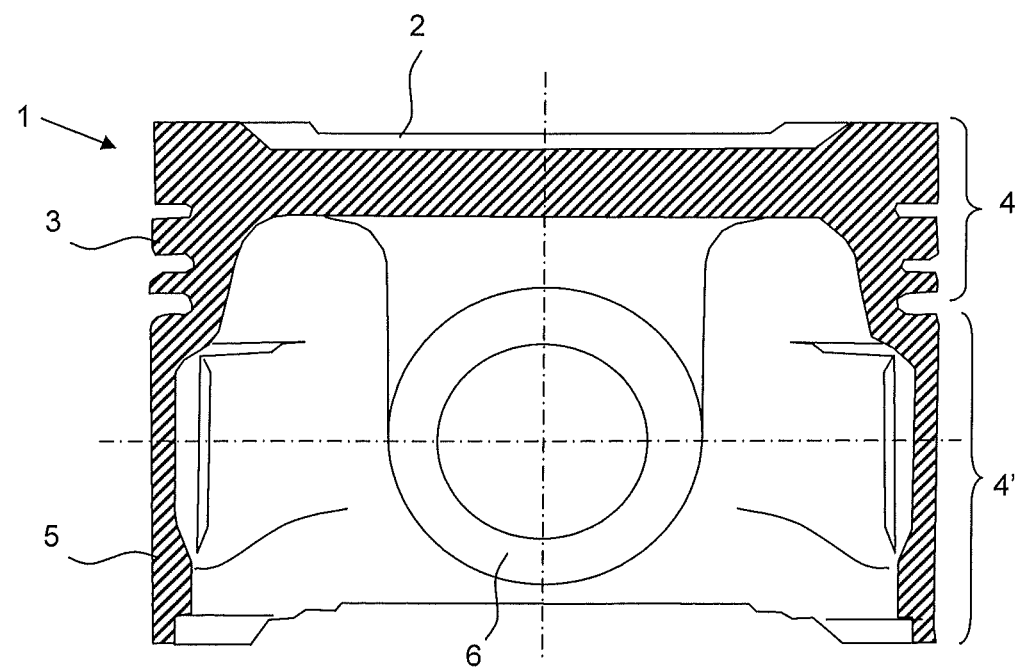
FIG. 2 shows a cross-sectional side view of a diesel engine piston.

The diesel piston shown in FIG. 2 is a so-called smooth skirt piston, a closed skirt 5, only penetrated in the region of a pin bore, in the lower piston part 4 being preferred. The connecting rod bearing 6 is also to be seen in FIG. 2.

The embodiments of the piston skirts for petrol engines are more complicated and are not illustrated figuratively.

Figure 1:
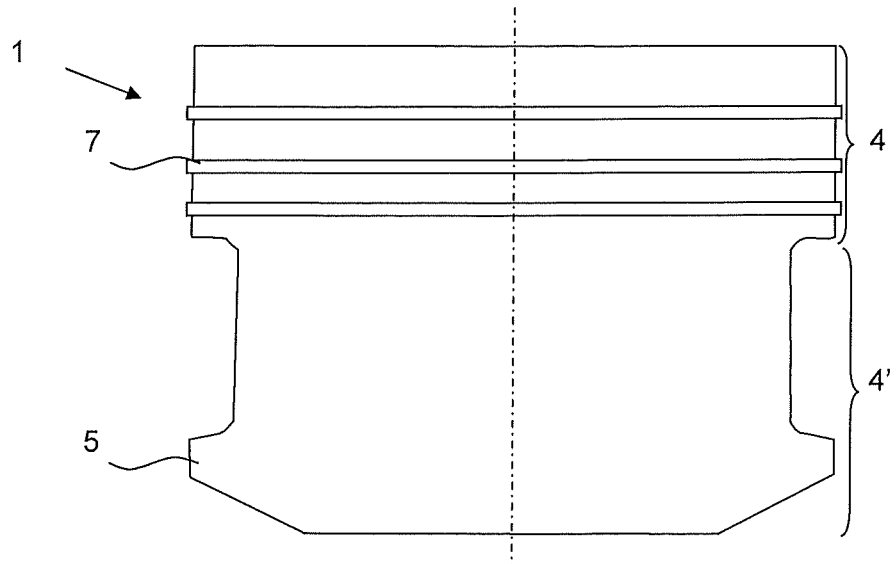
FIG. 1 shows a side view of a piston for a petrol engine.

For weight reasons and due to higher rotational speeds the piston skirt areas 5, as seen in FIG. 1, are comparatively narrow. The box-type piston or window piston illustrated in FIG. 1 represents a typical design; also asymmetric pistons with varyingly wide running surfaces are used.

The piston skirt 5 of the piston shown in FIGS. 1 and 2, which constitutes the section surrounding the lower piston part 4 to a greater or lesser degree, also has the function of guiding the piston 1 along a straight line in the cylinder. For this purpose the clearance between piston skirt 5 and cylindrical skirt must be sufficient.

This is particularly critical if a light metal alloy, such as aluminium alloy, which is distinguished by having a considerably higher thermal expansion coefficient than usual steels, is used for the cylinder crankcase. In order to prevent problems in the guide of piston at operating temperatures of up to 600° C., due to varying thermal expansion, which are perceptible for instance by noise such as slap being created due to piston knock, the inventive piston 1 or at least its piston skirt 5 is formed from an austenitic steel stabilized with nickel Ni, manganese Mn and nitrogen N, the thermal expansion coefficient of which lies in a range of 16 to $21 \times 10^{-6}$ $K^{-1}$. Also at operating temperature the close guide in the cylinder is provided for by this high thermal expansion coefficient, so that noise as a result of piston tilt is prevented when contact of the piston changes. Since piston noise is one of the main causes for noise of the crank mechanism in the internal combustion engine, and which is primarily instigated by lateral forces of the piston, so-called piston knock, the inventive solution of at least the piston skirt made of the austenitic steel with the thermal expansion coefficient is an effective measure for acoustically controlling engine noise and for reducing piston tilt.

The austenitic steel used according to the invention is composed of 0.2 to 0.4 wt.-% carbon, 8 to 18 wt.-% nickel, 15 to 26 wt.-% chrome, 0.5 to 2 wt.-% silicon, up to 12 wt.-% manganese, up to 2 wt.-% tungsten, up to 2 wt.-% niobium, up to 2 wt.-% aluminium and 0.05 to 0.3 wt.-% nitrogen as well as rest iron with companion elements typical for steel.

The thermal expansion coefficient of this austenitic steel having thermal expansion coefficients of 16 to $21 \times 10^{-6}$ $K^{-1}$ lies substantially over that of ferrite and that of austenitic cast iron. Due to this thermal expansion this austenite is particularly useful as piston skirt material for pistons in aluminium cylinder bores. In this case the piston skirt, likewise also the upper piston part, can already be prefabricated as semifinished product blank for the production of the piston.

As a result of the expansion matching the aluminium, the piston skirt takes over the guide function, while at the same time it has substantially higher strength and improved corrosion properties compared with aluminium alloys and austenitic cast iron. In this case the guide remains stable in the cylinder bore over the entire operating temperature range, noise as well as seizing of the piston being prevented.

The piston rings 7 to be seen in FIG. 1, which are present in the recesses provided for this purpose on the annular wall 3 of the upper piston part 1, are pressed exclusively by their pretension against the cylinder bore and take over the sealing function. The piston rings 7 may consist of other material. In the austenite used according to the invention for forming the piston shell 5, the alloying elements silicon, nickel, manganese, chrome ensure that the austenite is inhibited from conversion into ferrite and pearlite and that it is converted into martensite even at lower cooling rates. Austenite stabilization is the result of the elements nickel, manganese, nitrogen and carbon which can dissolve in the austenite in greater quantities than in the ferrite, by increasing the area in which the austenite phase exists.

Figure 3:
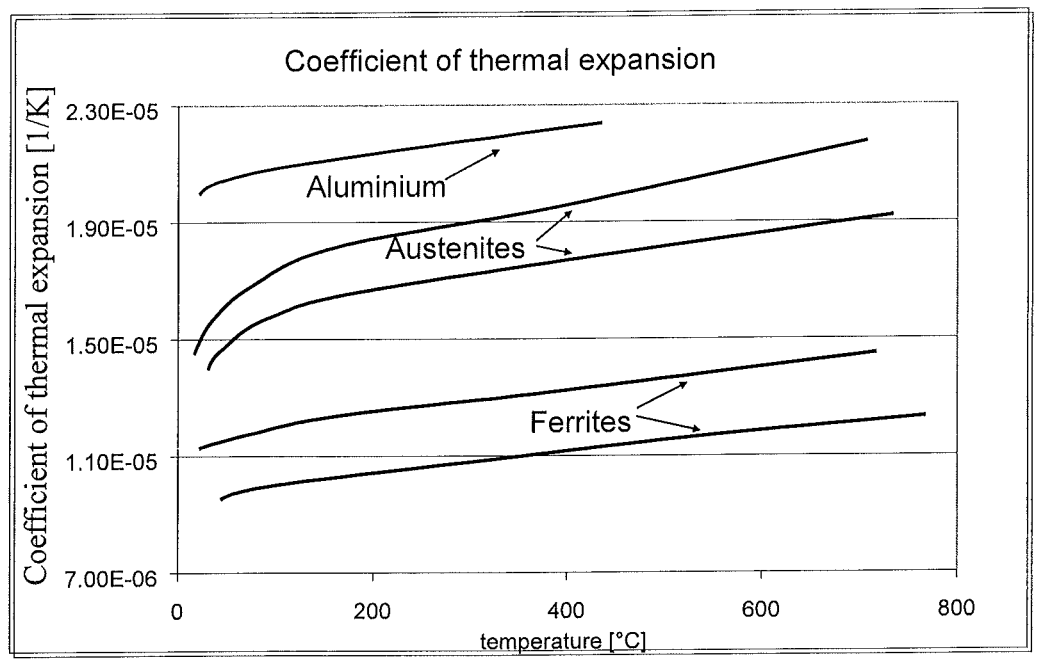
FIG. 3 shows a diagram in which expansion coefficients are plotted over the temperature for aluminium, austenites and ferrites.

In FIG. 3 the expansion coefficients of aluminium, various austenites and ferrites are plotted over the temperature. It is evident that certain austenites come close particularly at higher temperatures. In the case of the thermal expansion coefficient claimed according to the invention in a range of about 16 to $21 \times 10^{-6}$ $K^{-1}$ the thermal expansion coefficient is to be understood as 20° C. or room temperature. In comparison with FIG. 3 it becomes clear that this thermal expansion coefficient comes close to that of aluminium.

Apart from the high thermal expansion coefficients, high tensile strength and elongation at rupture are provided by the inventive austenitic steel alloy, so that the piston skirt can absorb lateral forces without deforming or superficial cracking, and in addition can flexibly adapt to the deformations of the cylinder. For this purpose the tensile strength may lie above 500 N/mm$^2$ and the elongation at rupture above 35%.

In this case the inventive piston can be produced as one piece from the austenitic steel alloy, production processes such as casting methods being particularly suitable.

Thus a low pressure casting method or a gravity casting method may be employed. Here also the cooling duct can be cast-in by a suitable core process.

On the other hand the piston can also be constructed from several pieces, whereby the upper piston part and the lower piston part can be composed of the same or also of different steel alloys, however both with high thermal expansion coefficient. Thus for example the upper piston part can be forged with the annular grooves in the annular wall and the combustion recess, which is more economical than by casting, particularly in the case of an upper piston part with cooling duct. For this purpose, generally the lower piston part can be forged.

Suitable semifinished product blanks, which are preformed accordingly as piston upper and lower part, can be assembled into an inventive steel piston. In order to join the two sections, especially welding methods such as induction welding, friction welding or laser welding come into consideration.

If the lower piston part necessary for precise guide, particularly the piston skirt, is formed by the inventive austenitic steel, the upper piston part however can also be formed by a material, with regard to which fewer high requirements are imposed. Thus for the upper piston part a highly wear-resistant alloyed heat treatable steel, which can have higher heat conductivity compared with the inventive austenitic steel, which has comparatively low heat conductivity, can be selected. Suitable steel for the upper piston part is selected from the group, which comprises MoCr4, 42CrMo4, CrMo4, 31CrMoV6 or 25MoCr4 steels.

While a piston produced as one piece from the austenitic steel can be made by gravity or low pressure casting, possible alternatives exist for producing pistons made from several pieces for instance in the production of the upper piston part from wrought steel by forging, the required mechanical and thermal properties being guaranteed in the region of the combustion recess. The lower piston part with the piston shell and connecting rod bearing are made of the inventive austenitic steel with a thermal expansion coefficient of 16 to $21 \times 10^{-6}$ per Kelvin by casting, preferably low pressure casting, in order to keep the gap between piston shell and cylinder bore as small as possible during hot operation. These two sections are then joined to one another by means of soldering or welding, preferably induction or friction welding.

Alternatively a piston constructed from several pieces can also be produced, as stated above, by joining for instance by friction welding, two or also more blanks, a first blank of which for forming the lower piston part is made of the inventive austenitic steel, while the second blank can also consist of another, for example micro-alloyed steel or one of those specified above. The blanks joined together in this way for example can then be formed into a piston by forging.

The piston which is illustrated as an example in FIGS. 1 and 2, apart from the combustion recess 2, can also have further geometric configurations, for example piston hubs, pin bore, possibly cooling duct and the like. These configurations in certain cases can already be provided in the blanks. Thus it is conceivable that the piston blank for forming the lower piston part is already of an at least partially hollow-cylinder shape. As known from DE 10 2005 034 306 A1, in this case a blank from a high temperature-resistant steel can also be used for forming a reinforcement on the combustion recess, which is joined by welding onto the piston blank accordingly and forms the reinforcement in a shaping step during the formation of the combustion recess. The blanks can also have different diameters depending upon the type of the subsequent shaping steps.

The advantage of the configuration of the piston skirt, or piston shell, with the austenitic steel and the high thermal expansion coefficient compared with other piston rings lies in the fact that, as a result of the thermal expansion of the piston skirt matching the cylinder bore made of aluminium, the piston guide remains almost constant over the entire operating temperature range and thus piston tilt and piston knock are prevented.

The steel piston formed according to the invention is especially suitable for application in aluminium cylinder crankcases, or in cylinder crankcases, the bores of which are formed by other materials, for instance cast-in cylinder bushes or anti-wear coatings.

The invention claimed is:

1. A steel piston (1) for combustion engines having cylinder crankcases made of light metal alloys, wherein the steel piston comprises at least one upper piston part (4) with a combustion recess (2) and an annular wall (3), and a lower piston part (4') with a piston skirt (5) and a connecting rod bearing (6), wherein at least the piston skirt (5) of the steel piston is made of an austenitic steel stabilized with Ni, Mn and N, and has a thermal expansion coefficient in a range of 16 to $21 \times 10^{-6}$ $K^{-1}$ and wherein the austenitic steel is an Fe—Cr—Ni-austenite with a composition comprising:

0.2 to 0.4 wt.-% C,
8 to 18 wt.-% Ni,
15 to 26 wt.-% Cr,
0.5 to 2 wt.-% Si,
up to 12 wt.-% Mn,
up to 2 wt.-% W,
up to 2 wt.-% Nb,
up to 2 wt.-% Al,
0.05 to 0.3 wt.-% N,
unavoidable traces and
Fe in a percentage, which corresponds to a difference portion for making up 100 wt.-% of the steel alloy.

2. The steel piston (1) according to claim 1, wherein the steel piston (1) is made of the austenitic steel as one piece.

3. The steel piston (1) according to claim 1, wherein the steel piston (1) is a forged steel piston.

4. The steel piston according to claim 1, wherein the steel piston (1) is constructed from several pieces, wherein at least the upper piston part (4) consists of a highly wear-resistant alloyed heat treatable steel.

5. The steel piston according to claim 4, wherein the steel piston (1) is assembled from at least two semifinished product blanks, wherein a first semifinished product blank provides the upper piston part (4) and a second semifinished product blank provides at least the piston skirt (5) of the lower piston part (4').

6. The steel piston according to claim 4, wherein the highly wear-resistant alloyed heat treatable steel is selected from the group consisting of MoCr4, 42CrMo4, CrMo4, 31 CrMoV6 and 25MoCr4 steels.

* * * * *